United States Patent
Planque et al.

(10) Patent No.: US 11,228,047 B2
(45) Date of Patent: Jan. 18, 2022

(54) METHOD FOR OVERHEATING GASES AT THE INLET OF A SOEC/SOFC-TYPE SOLID OXIDE STACK

(71) Applicant: COMMISSARIAT A L'ENERGIE ATOMIQUE ET AUX ENERGIES ALTERNATIVES, Paris (FR)

(72) Inventors: Michel Planque, Seyssins (FR); Charlotte Bernard, Contamine sur Arve (FR); Magali Reytier, Villard de Lans (FR); Guilhem Roux, Saint-Egreve (FR); Philippe Szynal, Chignin (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 7 days.

(21) Appl. No.: 16/475,836

(22) PCT Filed: Dec. 27, 2017

(86) PCT No.: PCT/FR2017/053850
§ 371 (c)(1),
(2) Date: Jul. 3, 2019

(87) PCT Pub. No.: WO2018/127649
PCT Pub. Date: Jul. 12, 2018

(65) Prior Publication Data
US 2019/0372137 A1    Dec. 5, 2019

(30) Foreign Application Priority Data

Jan. 5, 2017  (FR) .................................. 17 50099

(51) Int. Cl.
*H01M 8/04007*  (2016.01)
*C25B 15/02*  (2021.01)
(Continued)

(52) U.S. Cl.
CPC .......... *H01M 8/04037* (2013.01); *C25B 9/67* (2021.01); *C25B 9/70* (2021.01); *C25B 15/02* (2013.01);
(Continued)

(58) Field of Classification Search
CPC .... F28D 7/04; H05B 3/78; C25B 1/04; C25B 1/042
See application file for complete search history.

(56) References Cited

U.S. PATENT DOCUMENTS 1,654,551 A    1/1928  Muhleisen
1,833,664 A  * 11/1931  Vandegrift ................ F28B 1/00
                                                           165/170
(Continued)

FOREIGN PATENT DOCUMENTS

CN        102404973 A    4/2012
WO    WO 2014/112378 A1    7/2014

OTHER PUBLICATIONS

Houaijia et al., Solar power tower as heat and electricity source for a solid oxide electrolyzer: a case study, International Journal of Energy Research, vol. 39, Issue 8, Jun. 2015, pp. 1120-1130 (Year: 2015).*

(Continued)

*Primary Examiner* — Harry D Wilkins, III
(74) *Attorney, Agent, or Firm* — Oblon, McClelland, Maier & Neustadt, L.L.P.

(57) ABSTRACT

A system for overheating gases at the inlet of a SOEC/SOFC-type solid oxide stack, the stack including a main body that has first and second zones separated by a median plane, and inflow and outflow conduits, the zones include gas circulation circuits extending in the form of a spiral and communicating by means of a passage passing through the main body. A gas flow to be heated entering the inflow (Continued)

conduit circulates in the first gas circulation circuit and passes through the passage to then circulate in the second gas circulation circuit and in the conduit for the outflow of the reheated gases in order to reach the inlet of the SOEC/SOFC-type solid oxide stack.

11 Claims, 5 Drawing Sheets

(51) Int. Cl.

| | | |
|---|---|---|
| *H01M 8/12* | (2016.01) | |
| *C25B 9/70* | (2021.01) | |
| *C25B 9/67* | (2021.01) | |
| *H01M 8/243* | (2016.01) | |
| *F28D 7/04* | (2006.01) | |
| *H01M 8/124* | (2016.01) | |
| *F28D 21/00* | (2006.01) | |

(52) U.S. Cl.
CPC ............... *F28D 7/04* (2013.01); *H01M 8/12* (2013.01); *H01M 8/243* (2013.01); *F28D 2021/0043* (2013.01); *H01M 2008/1293* (2013.01)

(56) References Cited

U.S. PATENT DOCUMENTS

| | | | | |
|---|---|---|---|---|
| 4,508,957 A | * | 4/1985 | Rocchitelli | ............ B60S 1/481 392/479 |
| 4,687,907 A | * | 8/1987 | Barkley | ................ B23K 3/047 228/234.1 |
| 7,760,993 B2 | * | 7/2010 | You | ....................... D06F 39/008 392/494 |
| 2003/0134174 A1 | | 7/2003 | Akikusa et al. | |
| 2004/0197094 A1 | * | 10/2004 | Amberg | ................. F24H 1/121 392/484 |
| 2005/0005592 A1 | | 1/2005 | Fielder | |
| 2007/0029369 A1 | * | 2/2007 | Watkins | .............. B23K 20/021 228/183 |
| 2009/0130522 A1 | | 5/2009 | Akikusa et al. | |
| 2010/0258449 A1 | | 10/2010 | Fielder | |
| 2010/0315782 A1 | * | 12/2010 | Pautsch | ..................... F28F 3/12 361/702 |
| 2010/0316919 A1 | * | 12/2010 | Ernst | ................ H01M 8/04089 429/423 |
| 2013/0126360 A1 | * | 5/2013 | Ise | ........................... C25B 1/04 205/412 |
| 2015/0075754 A1 | * | 3/2015 | Engelhardt | ........ H05K 7/20254 165/104.26 |

OTHER PUBLICATIONS

International Search Report dated Apr. 24, 2018 in PCT/FR2017/053850 (submitting English translation only), citing documents AA, AB, AC, AO and AP therein, 3 pages.
U.S. Appl. No. 13/583,110, filed Sep. 6, 2012, US 2012-0325654 A1, Le Gallo, P., et al.
U.S. Appl. No. 16/062,373, filed Jun. 14, 2018, US 2019-0013539 A1, Reytier, M., et al.
U.S. Appl. No. 13/501,627, filed Jun. 27, 2012, US 2012-0258384 A1, Reytier, M., et al.
U.S. Appl. No. 14/354,772, filed Apr. 28, 2014, US 2014-0329161 A1, Laurencin, J., et al.
U.S. Appl. No. 16/333,299, filed Mar. 14, 2019, Lacroix, V., et al.

* cited by examiner

METHOD FOR OVERHEATING GASES AT THE INLET OF A SOEC/SOFC-TYPE SOLID OXIDE STACK

CROSS-REFERENCE TO RELATED APPLICATIONS

This application is a United States national stage application of International Application No. PCT/FR2017/053850, filed Dec. 27, 2017, which designates the United States, and claims priority to French Patent Application No. 1750099, filed Jan. 5, 2017, and the entire contents of each of the above applications are hereby incorporated herein by reference in entirety.

TECHNICAL FIELD

The present invention relates to the general field of high-temperature electrolysis (HTE), in particular high-temperature steam electrolysis (HTSE), carbon dioxide ($CO_2$) electrolysis, and high-temperature water (HTE)/carbon dioxide ($CO_2$) co-electrolysis.

More precisely, the invention relates to the field of high-temperature solid-oxide electrolyzers, commonly referred to as solid-oxide electrolyzer cells (SOECs).

It also concerns the field of high-temperature solid-oxide fuel cells (SOFCs).

Thus, more generally, the invention refers to the field of high-temperature SOEC/SOFC stacks.

More precisely, the invention concerns an SOEC/SOFC stack inlet gas superheat system, an assembly comprising such a gas superheat system and at least one heating element in contact therewith, an SOEC/SOFC stack comprising such an assembly, as well as a process for manufacturing such a gas superheat system.

STATE OF THE PRIOR ART

SOECs are used to transform, by means of an electric current within the same electrochemical device, steam ($H_2O$) into hydrogen ($H_2$) and oxygen ($O_2$), and/or carbon dioxide ($CO_2$) into carbon monoxide (CO) and oxygen ($O_2$). In SOFCs the operation is reversed to produce an electric current and heat from a supply of hydrogen ($H_2$) and oxygen ($O_2$), typically air and natural gas, namely methane ($CH_4$). For the sake of simplicity, the following description focuses on the operation of an SOEC for water electrolysis. However, this operation is applicable to carbon dioxide ($CO_2$) electrolysis and to high-temperature (HTE)/carbon dioxide ($CO_2$) co-electrolysis. In addition, this operation can be transposed to an SOFC.

The electrolysis of water is advantageously carried out at high temperature, typically between 600 and 1000° C., because it is more advantageous to electrolyze steam than liquid water and because part of the energy required for the reaction can be provided by heat, less expensive than electricity.

For HTE, an SOEC consists of a stack of repeating units each containing a solid-oxide electrolysis cell, or an electrochemical cell, consisting of three layers, anode/electrolyte/cathode, stacked on top of each other, and metal alloy interconnect plates, also called bipolar plates or interconnects. Each electrochemical cell is sandwiched between two interconnect plates. An SOEC is thus an alternating stack of electrochemical cells and interconnects. An SOFC consists of the same type of stacking of repeating units. Since this high-temperature technology is reversible, the same stack can operate in electrolysis mode and produce hydrogen and oxygen from water and electricity, or in fuel cell mode and produce electricity from hydrogen and oxygen.

Each electrochemical cell corresponds to an electrolyte/electrode assembly, which is typically a multilayer ceramic assembly whose electrolyte is formed by an ion-conducting central layer, this layer being solid, dense and gas-tight, and sandwiched between the two porous layers forming the electrodes. It should be noted that additional layers may exist, but they are only used to improve one or more of the layers already described.

The electrical and fluidic interconnect devices are electronic conductors that provide, from an electrical point of view, the connection of each repeating unit electrochemical cell in the stack of repeating units, guaranteeing electrical contact between one face and the cathode of one cell and between the other face and the anode of the next cell, and, from a fluidic point of view, thus combining the production of each of the cells. The interconnects thus perform the functions of electricity supply and collection and delimit gas circulation compartments for distribution and/or collection.

More precisely, the main function of the interconnects is to ensure the passage of electric current but also the circulation of gases in the vicinity of each cell (i.e.: steam injected, hydrogen and oxygen extracted for HTE; air and fuel including hydrogen injected and water extracted for an SOFC), and to separate the anode and cathode compartments of two adjacent cells, which are the gas circulation compartments on the anodes and cathode sides, respectively, of the cells.

In particular, for an SOEC, the cathode compartment contains steam and hydrogen, the product of the electrochemical reaction, while the anode compartment contains a carrier gas, if present, and oxygen, another product of the electrochemical reaction. For an SOFC, the anode compartment contains the fuel, while the cathode compartment contains the oxidant.

To achieve HTE, steam ($H_2O$) is injected into the cathode compartment. Under the effect of the electric current applied to the cell, the dissociation of water molecules in the form of steam occurs at the interface between the hydrogen electrode (cathode) and the electrolyte: this dissociation produces hydrogen gas ($H_2$) and oxygen ions ($O^{2-}$). The hydrogen ($H_2$) is collected and discharged from the hydrogen compartment. The oxygen ions ($O^{2-}$) migrate through the electrolyte and recombine into oxygen ($O_2$) at the interface between the electrolyte and the oxygen electrode (anode). A carrier gas, such as air, can circulate at the anode and thus collect the oxygen generated in gaseous form at the anode.

To operate an SOFC, air (oxygen) is injected into the cathode compartment of the cell and hydrogen is injected into the anode compartment. The oxygen in the air will dissociate into $O^{2-}$ ions. These ions will migrate into the electrolyte from the cathode to the anode to oxidize the hydrogen and form water with simultaneous production of electricity. In SOFC, as in SOEC, steam is located in the hydrogen ($H_2$) compartment. Only the polarity is reversed.

Figure 1:
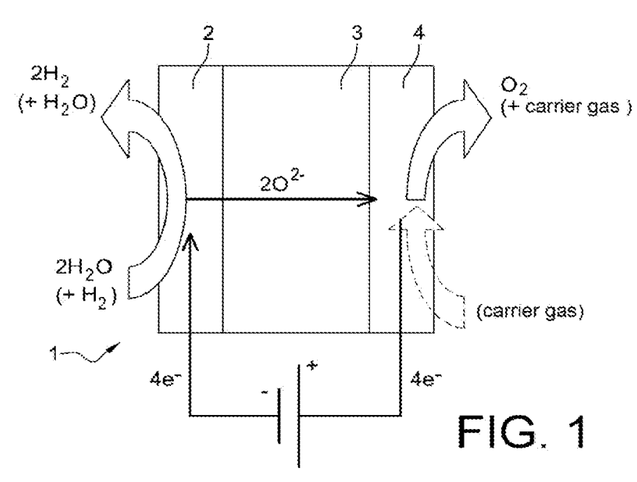
FIG. 1 is a schematic view showing the operating principle of an SOEC.

By way of illustration, FIG. 1 is a schematic view showing the operating principle of an SOEC. The function of such an electrolyzer is to transform steam into hydrogen and oxygen according to the following electrochemical reaction:

$$2H_2O \rightarrow 2H_2 + O_2.$$

This reaction is carried out electrochemically in the cells of the electrolyzer. As shown in FIG. 1, each repeating electrolysis cell 1 consists of a cathode 2 and an anode 4, placed on either side of a solid electrolyte 3. The two electrodes (cathode and anode) 2 and 4 are electronic and/or ionic conductors, made of porous material, and the electrolyte 3 is gas-tight, electronically insulating and ionically conductive. The electrolyte 3 can be in particular an anionic conductor, more precisely an anionic conductor of $O^{2-}$ ions, and the electrolyzer is then called an anionic electrolyzer, as opposed to proton ($H^+$) electrolytes.

Electrochemical reactions take place at the interface between each of the electronic conductors and the ionic conductor.

At the cathode 2, the half-reaction is as follows:

At the anode 4, the half-reaction is as follows:

The electrolyte 3, sandwiched between the two electrodes 2 and 4, is where $O^{2-}$ ions migrate under the effect of the electric field created by the potential difference imposed between the anode 4 and the cathode 2.

As shown in parentheses in FIG. 1, steam at the cathode inlet can be accompanied by hydrogen $H_2$ and hydrogen produced and recovered at the outlet can be accompanied by steam. Similarly, as shown with a dotted line, a carrier gas, such as air, can also be injected at the inlet to evacuate the oxygen produced. The injection of a carrier gas has the additional function of acting as a thermal regulator.

An electrolyzer, or electrolysis reactor, consists of a repeating cell as described above, with a cathode 2, an electrolyte 3, and an anode 4, and two interconnects that provide the electrical, hydraulic and heat distribution functions.

To increase the flow rates of the hydrogen and oxygen produced, it is known to stack several repeating electrolysis cells on top of each other, separated by interconnects. The assembly is positioned between two end interconnect plates that support the electrical and gas supplies to the electrolyzer (electrolysis reactor).

An SOEC thus comprises at least one, generally a plurality of electrolysis cells stacked on top of each other, each repeating cell being formed of an electrolyte, a cathode and an anode, the electrolyte being sandwiched between the anode and the cathode.

As previously mentioned, the fluidic and electrical interconnect devices that are in electrical contact with one or more electrodes generally provide the electric current supply and collection functions and delimit one or more gas circulation compartments.

Thus, the function of the so-called cathode compartment is to distribute electric current and steam and to recover hydrogen at the cathode in contact.

The function of the so-called anode compartment is to distribute electric current and to recover the oxygen produced at the anode in contact, optionally by means of a carrier gas.

Figure 2:
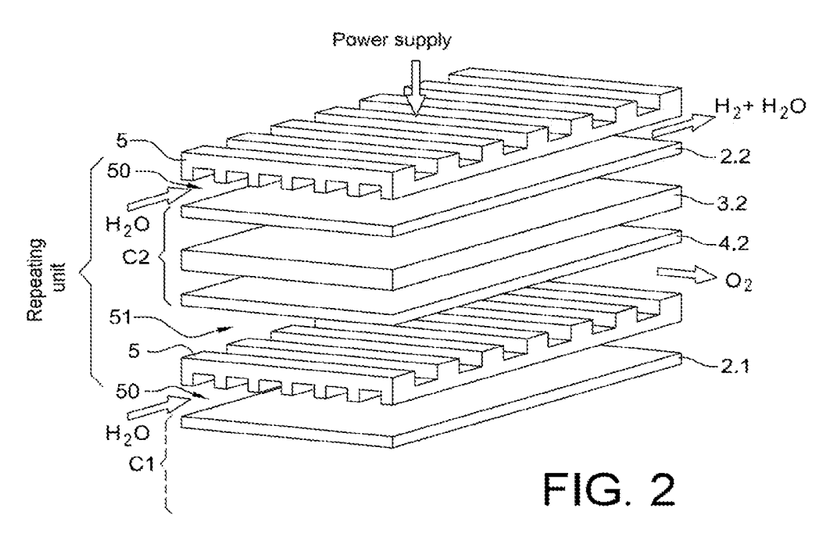
FIG. 2 is an exploded schematic view of a part of an SOEC comprising interconnects according to the prior art.

FIG. 2 shows an exploded view of the repeating units of an SOEC according to the prior art. This electrolyzer comprises a plurality of repeating electrolysis cells C1, C2, of SOEC type, stacked alternately with interconnects 5. Each cell C1, C2 consists of a cathode 2.1, 2.2 and an anode (only the anode 4.2 of the cell C2 is shown), between which an electrolyte (only the electrolyte 3.2 of the cell C2 is shown) is arranged.

The interconnect 5 is a metal alloy component that separates the cathode 50 and anode 51 compartments, defined by the volumes between the interconnect 5 and the adjacent cathode 2.1 and between the interconnect 5 and the adjacent anode 4.2, respectively. It also distributes gases to the cells. Steam is injected into the cathode compartment 50 of each repeating unit. The hydrogen produced and the residual steam at the cathode 2.1, 2.2 is collected in the cathode compartment 50 downstream of the cell C1, C2 after dissociation of the steam by the latter. The oxygen produced at the anode 4.2 is collected in the anode compartment 51 downstream of the cell C1, C2 after dissociation of the steam by the latter. The interconnect 5 carries current between the cells C1 and C2 by direct contact with adjacent electrodes, i.e. between the anode 4.2 and the cathode 2.1.

The operating conditions of an SOEC are very similar to those of an SOFC, so the same technological constraints apply.

Thus, the proper functioning of such high-temperature SOEC/SOFC stacks requires mainly the following points to be met.

First, it is necessary to have electrical insulation between two successive interconnects, or else the electrochemical cell will short circuit, but also a good electrical contact and a sufficient contact surface between a cell and an interconnect. The lowest possible ohmic resistance is sought between cells and interconnects.

In addition, it is necessary to have a gas-tight seal between the anode and cathode compartments, otherwise the gases produced will recombine, resulting in decreased efficiency and especially the appearance of hot spots that damage the stack.

Finally, it is essential to have a good distribution of gases both at the inlet and in the recovery of the products, otherwise there is loss of efficiency, inhomogeneity of pressure and temperature within the various repeating units, and even unacceptable degradation of the electrochemical cells.

Figure 3:
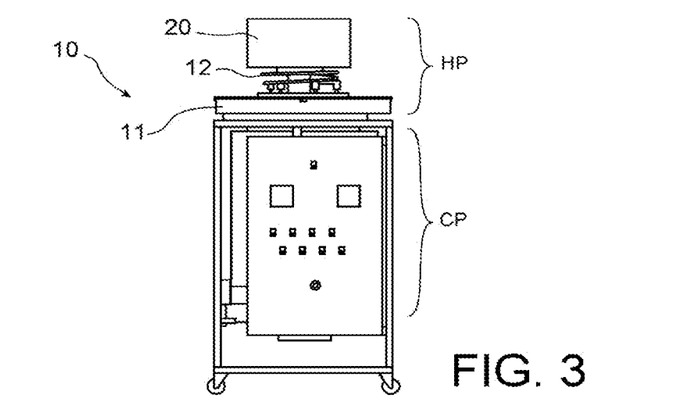
FIG. 3 illustrates the principle of the architecture of a furnace on which a high-temperature SOEC or SOFC stack is placed.

Gases entering and leaving a high-temperature SOEC or SOFC stack can be managed through appropriate devices in a furnace such as the one shown in FIG. 3.

The furnace 10 thus comprises cold parts CP and hot parts HP, the latter comprising the furnace hearth 11, a loop tube 12 to manage gas inlets and outlets and the SOEC or SOFC stack 20.

Conventionally, there are two main techniques for superheating inlet gases in an SOEC or SOFC stack.

First, as shown schematically by the loop tube 12 in FIG. 3, it is possible to use coiled tube lengths at the heating resistors of a furnace 10 in the hot part HP. The gases will have previously been heated to a temperature of about 500° C. at the outlet of the exchangers if this is provided for by the system. Then, this or these gas superheat tubes 12 allow an additional increase of about 300° C. by using the thermal radiation of the resistances of the furnace 10 and the stack 20, before being introduced into the stack 20.

Figure 4:
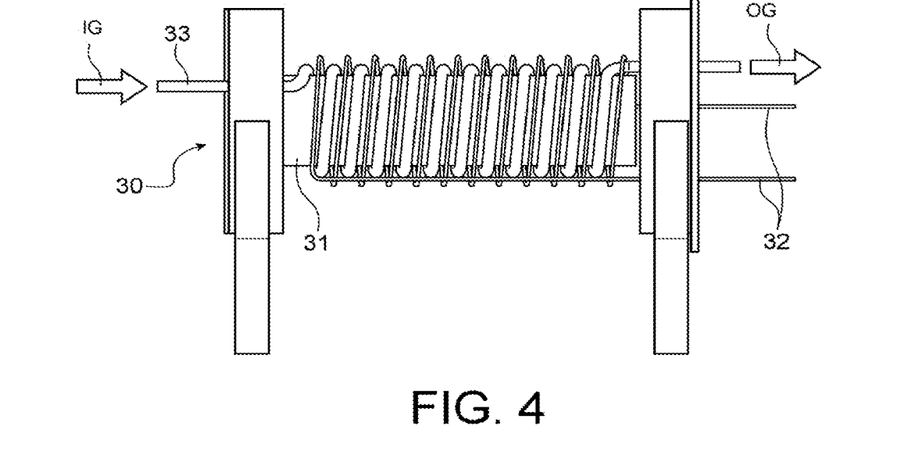
FIG. 4 illustrates the principle of an electric gas heater according to the prior art.

In addition, it is also known to pass gases through electric heaters such as the one shown in FIG. 4. Such an electric heater 30 is similar to a massive assembly comprising an inertial mass 31 made of steel, a heating resistor 32 and a gas tube 33 wound on the inertial mass 31. FIG. 4 also shows the inlet gases IG and the outlet gases OG. These electric heaters 30 are responsible for bringing the inlet gases IG from 20° C. to a temperature of about 800° C. before the outlet gases OG are introduced into the stack 20.

The proper functioning of these two main techniques mentioned above requires a very precise temperature at the inlet of the stack 20 in order to guarantee the proper functioning of the assembly. The first technique is therefore usually preferred.

As a general rule, to obtain the correct temperature at the inlet of the stack 20, and for an inner diameter of tube 12 of about 10 mm, it is necessary to have a developed length of about 3 m per inlet gas line, typically $H_2O$ and $N_2O_2$, with a flow rate between 5 and 15 $Nm^3/s$. This length of about 3 m, allows an increase of about 300° C., works equally well in SOEC or SOFC stack mode, and ensures the correct temperature at the stack inlet.

However, this first technique, which, after passing the gases through the exchangers, recovers the radiation of the resistances of the furnace to raise the gases to the correct temperature at the stack inlet, therefore requires windings of about 3 m in length, which has the disadvantage of adding complexity to the bends to ensure that the tubes reach the correct places in a confined space, and which significantly increases the size of the furnace. The implementation is therefore complicated because it is necessary to be precise and because the tubes, typically $^{10}/_{12}$ in diameter in 316L stainless steel or Inconel 600, are very rigid. In addition, making gas superheat loops takes up a lot of space, and inevitably interferes with power supplies, thermocouple passages, and electrolyzer outlet tubes, which often leads to shortening these lines due to lack of space in the furnace. In addition, the same bending work must be done again each time a new stack is added, because disassembling the connection of these loops is destructive.

Moreover, it is necessary to make a long and expensive treatment of these gas lines by alumina deposition in order to avoid pollution due to oxidation when 316L stainless steel is used. These particles (chromium, vanadium, etc.) can become attached to this cell, and thus reduce the performance of the SOEC/SOFC stack.

Furthermore, the second technique requires a superheater 30 per gas inlet. However, these are massive units that take up a lot of space, while there is an increasing trend towards compact systems. There are therefore as many electric superheaters as there are gas inlets, which, when integrating the peripheral elements into a furnace, poses serious problems. There is therefore a need to place the gas outlet of this electric heater 30 as close as possible to the stack inlets in order to avoid tracing the line by heating arm.

DISCLOSURE OF THE INVENTION

The aim of the invention is to remedy at least partially the needs mentioned above and the disadvantages relating to the achievements of the prior art.

It aims in particular at the realization of a particular design of an SOEC or SOFC stack inlet gas superheat system, and more specifically to realize, in the hot part, i.e. inside the enclosure of a furnace, and at the gas inlets and outlets, a compact, removable and reusable superheat system, thus giving the stack a "Plug & Play" (PnP) character.

The object of the invention is therefore, according to one of its aspects, an SOEC/SOFC stack inlet gas superheat system, characterized in that it comprises:
- a main body comprising a first zone, called the lower zone, for the inlet of the gases to be heated, and a second zone, called the upper zone, for the outlet of the heated gases, the first and second zones being separated by a transverse median plane of the main body,
- at least one inlet duct for gases to be heated communicating with the first zone of the main body,
- at least one outlet duct for heated gases communicating with the second zone of the main body, the first and second zones of the main body comprising respectively a first gas circulation circuit and a second gas circulation circuit, the first gas circulation circuit and the second gas circulation circuit, respectively, extending in the form of a spiral from a first outer end to a first inner end, respectively from a second outer end to a second inner end, the first and second inner ends communicating with each other via a through-passage of the main body, formed through the median plane of the main body for fluid communication of the first and second zones, the at least one inlet duct and one outlet duct being in fluid communication with the first and second outer ends, respectively, so that a flow of gas to be heated entering the at least one inlet duct flows into the first gas circulation circuit, from the first outer end to the first inner end, and passes through the through-passage to then flow into the second gas circulation circuit, from the second inner end to the second outer end, and then into the at least one heated gas outlet duct to reach the inlet of the SOEC/SOFC stack.

By virtue of the invention, it is possible to avoid the complicated tubular windings to be implemented, as described previously in connection with the first gas overheating technique, by means of an innovative and compact geometry compared with nearly 3.6 meters of bent tubes in the furnace enclosure per gas line. This results in significant savings in terms of space requirements.

Moreover, since the superheat system according to the invention can be part of the stack, it is possible to avoid redoing the tubular windings with each new stack while the tubular loop system according to the first technique of the prior art is not recoverable.

In addition, it may be easy to put thermocouples at the outlet of the superheat system according to the invention to know with precision the temperature at which the gases enter the stack, whereas for tubes according to the prior art, it is more complicated due to the lack of space and the curved geometries of the windings.

In addition, the gas path within the superheat system according to the invention is facilitated by the spiral geometry allowing good continuity in the inlet gas flow while limiting pressure drops.

In addition, any treatment by deposition of alumina is only required once inside the superheat system to avoid pollution by evaporation of chromium and other elements.

The superheat system according to the invention may further comprise one or more of the following features taken individually or in any possible technical combination.

Advantageously, the superheat system is at the inlet of an SOEC/SOFC stack placed on a furnace, the superheat system being positioned in the hot part, i.e. inside the furnace enclosure.

In an advantageous way, fluid communication between the first and second zones of the main body is only allowed through the passage through the main body. In particular, the inlet and outlet ducts are not in fluid communication with each other, so that the inlet gases from the inlet duct necessarily flow into the first and second gas circulation circuits before joining the outlet duct from which the heated outlet gases exit.

The superheat system may comprise a first closure plate and a second closure plate, extending on either side of the main body to cover the first and second zones of the main body, respectively, the first gas circulation circuit being then located between the median plane and the first closure plate and the second gas circulation circuit being then located between the median plane and the second closure plate.

In addition, the at least one inlet duct and one outlet duct may extend substantially perpendicular to the median plane of the main body in superposition with respect to each other and may be separated from each other by a transverse median wall of the main body in which the through-passage is formed.

Furthermore, the main body may advantageously have a general cylindrical shape, particularly of circular cross-section, the first and second gas circulation circuits each notably extending in the form of a circular spiral.

However, the main body may alternatively have any other type of cross-sectional shape, for example a polygonal shape, for example a square or rectangular shape. Similarly, the spiral shape of the first and second gas circulation circuits is not limited to a circular shape. It can for example correspond to a polygonal spiral, for example a square or rectangular spiral. The term "spiral" is therefore not limited to a circular spiral shape. In general, the term "spiral" means that the circuit starts from an outer point and extends to an inner point by successive rotation in the manner of a spiral around this inner point and towards this inner point.

It should be noted, however, that a polygonal geometry, and in particular a square or rectangular geometry, can generate turbulence that certainly allows for better heat exchange but also increases pressure losses due to wall effects.

It should also be noted that the general shapes of the main body and the spirals of the first and second gas circulation circuits are not necessarily identical. For example, the main body may have a cylindrical shape with a polygonal cross-section and the gas circulation circuits may have a circular spiral shape.

Furthermore, the main body may comprise a main portion, including the first and second gas circulation circuits, and a projecting lateral portion of the main portion at which the at least one inlet and outlet duct are fluidly connected to the main body.

The main body can for example be made of nickel-based superalloy, particularly Inconel 600.

The invention also has as its object, according to another of its aspects, an assembly, characterized in that it comprises:
- at least one SOEC/SOFC stack inlet gas superheat system,
- at least one heating element, in particular in the form of a heating plate, placed in contact with the at least one gas superheat system.

The assembly may in particular comprise at least two heating elements arranged on either side of the at least one gas superheat system.

More particularly, the assembly may comprise at least two gas superheat systems, in contact with each other, and at least two heating elements sandwiching the at least two gas superheat systems.

In addition, at least one heating element, particularly all the heating elements, may have a general shape substantially similar to that of at least one gas superheat system, particularly all the gas superheat systems.

In addition, the invention also has as its object, according to another of its aspects, an SOEC/SOFC stack, characterized in that it comprises an assembly as defined above.

Moreover, the invention also has as its object, according to another of its aspects, a process for manufacturing at least one SOEC/SOFC stack inlet gas superheat system as defined above, characterized in that it comprises the step of machining the main body to form the first gas circulation circuit and the second gas circulation circuit.

The process may also comprise the step of attaching, by a laser transmission welding process, a first closure plate and a second closure plate on either side of the main body to cover the first and second zones of the main body, respectively.

The superheat system, the assembly, the SOEC/SOFC stack and the manufacturing process according to the invention may comprise any of the features set out in the description, taken individually or in any technically possible combination with other features.

BRIEF DESCRIPTION OF THE DRAWINGS

The invention can be better understood by reading the following detailed description, an exemplary non-limiting implementation thereof, and by examining the figures, schematic and partial, of the annexed drawing, on which.

In all these figures, identical references may refer to identical or similar elements.

In addition, the different parts represented on the figures are not necessarily represented on a uniform scale, to make the figures easier to read.

DETAILED DISCLOSURE OF A PARTICULAR EMBODIMENT

FIGS. 1 to 4 have already been described above in the section on the state of the art and the technical context of the invention. It is specified that, for FIGS. 1 and 2, the symbols and arrows for the supply of steam $H_2O$, distribution and recovery of hydrogen $H_2$, oxygen $O_2$, air and electric current are shown for clarity and precision purposes, to illustrate the operation of the devices shown.

In addition, it should be noted that all the components (anode/electrolyte/cathode) of a given electrochemical cell are preferentially ceramics. The operating temperature of a high-temperature SOEC/SOFC stack is also typically between 600 and 1000° C.

Furthermore, the terms "upper" and "lower", if used, are to be understood here according to the normal direction of orientation of an SOEC/SOFC stack when in its configuration of use.

FIGS. 5 to 11 illustrate a principle of realization of a superheat system 40 according to the invention. This superheat system 40 heats the inlet gases of an SOEC/SOFC stack 20 associated with a furnace 10, as previously described in reference to FIG. 3.

Among the different heat transfer modes in the zone of the furnace 10, the predominant mode at these temperature levels, between 650 and 800° C., corresponds to radiative exchanges by radiation. The other transfer mode is then thermal conduction, and this is the one that the invention implements because it has the advantage of creating less heat loss to the outside. This is the mode of heat transfer caused by a temperature difference between two regions of the same medium or between two media in contact without appreciable displacement of material. The use of heating plates, as described below, for the superheat system 40 allows the heat conduction to be recovered and the gases to be raised to the correct temperature.

As shown in FIGS. 1 to 8, the superheat system 40 for the gases OG entering the SOEC/SOFC stack 20 first comprises a main body 41 in the form of a central block 41.

Figure 5:
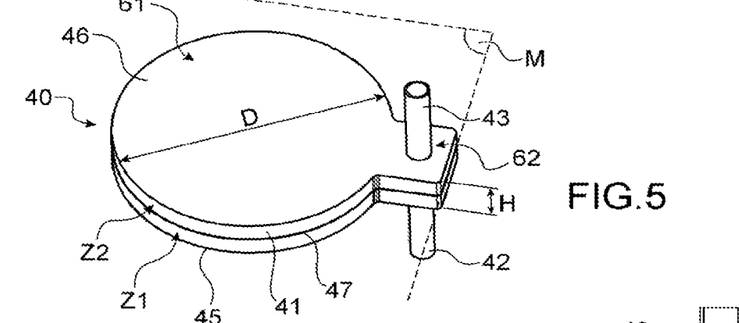
FIG. 5 shows, in perspective, an exemplary gas superheat system in conformity with the invention for an SOEC/SOFC stack.

This central block 41 forms a compact system which is here in a cylindrical shape of circular cross-section, with a diameter D of about 140 mm and a height H of about 22 mm, as shown in FIG. 5.

This central block 41 is for example made of nickel-based superalloy, particularly Inconel 600.

Figure 6:
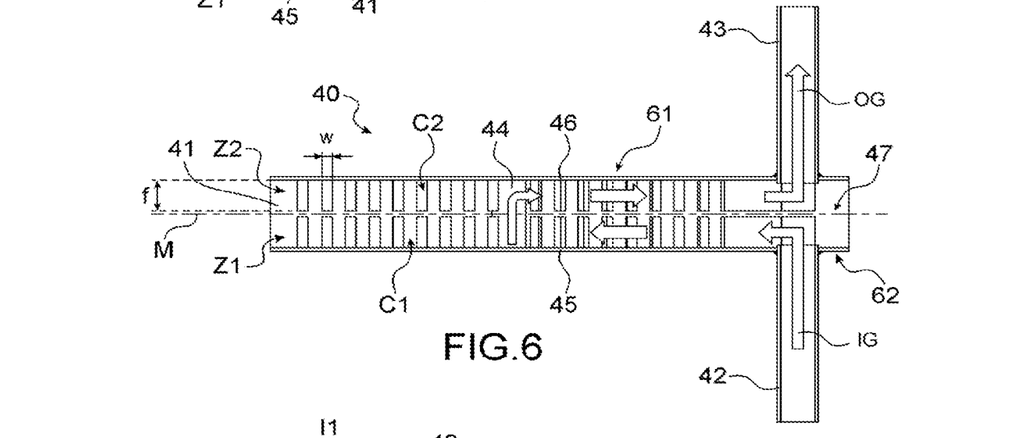
FIG. 6 shows, according to a cross-sectional view, the superheat system in FIG. 5.

As shown in FIG. 6, the central block 41 has a first zone Z1, called the lower zone, for the inlet of the gases to be heated IG and a second zone Z2, called the upper zone, for the outlet of the heated gases OG.

These lower Z1 and upper Z2 zones are separated by a transverse median plane M of the central block 41.

Furthermore, the superheat system 40 also comprises an inlet duct 42 for the gases to be heated IG communicating with the lower zone Z1 of the central block 41, and an outlet duct 43 for the heated gases OG communicating with the upper zone Z2 of the central block 41.

As shown in FIG. 6, these first Z1 and second Z2 zones comprise a first gas circulation circuit C1 and a second gas circulation circuit C2, respectively.

Advantageously, each gas circulation circuit C1, C2 extends in the form of a spiral, here circular, respectively from a first outer end P1 to a first inner end I1, and from a second outer end P2 to a second inner end I2.

These first I1 and second I2 inner ends communicate with each other via a through-passage 44 of the central block 41, which is formed through the median plane M for the fluid communication of the first Z1 and second Z2 zones.

In addition, as also shown in FIG. 6, the inlet 42 and outlet 43 ducts are in fluid communication with the first P1 and second P2 outer ends, respectively.

Figure 7:
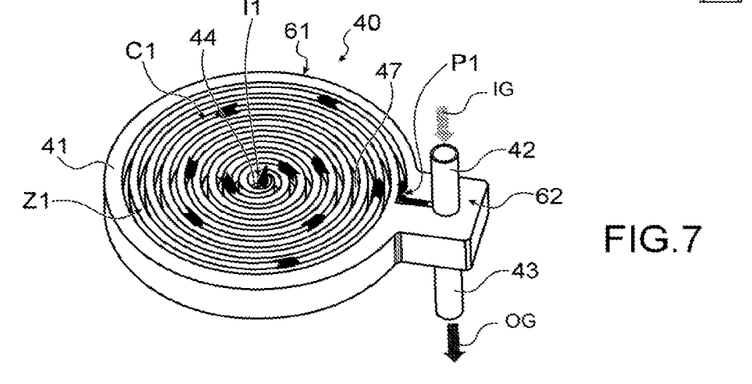
FIG. 7 shows, in perspective, the superheat system in FIG. 5, without the presence of closure plates, on the gas inlet side.
Figure 8:
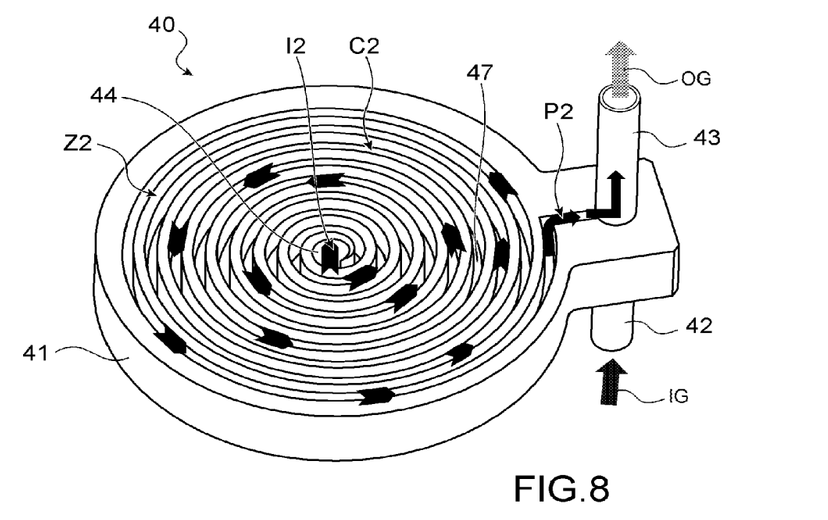
FIG. 8 shows, in perspective, the superheat system in FIG. 5, without the presence of closure plates, on the gas outlet side.

In this way, as illustrated by the course of the arrows in FIGS. 6, 7 and 8, a flow of gas to be heated IG entering the inlet duct 42 flows into the first gas circulation circuit C1, from the first outer end P1 to the first inner end I1, and crosses the through-passage 44 and then flows into the second gas circulation circuit C2, from the second inner end I2 to the second outer end P2, and then into the heated gas OG outlet duct 43 to finally reach the inlet of the SOEC/SOFC stack 20.

In addition, as shown in FIGS. 5 and 6, the superheat system 40 has two closure plates 45 and 46, extending on either side of the central block 41. More precisely, the first gas circulation circuit C1 is located between the median plane M and the closure plate 45 and the second gas circulation circuit C2 is located between the median plane M and the closure plate 46.

Furthermore, the first C1 and second C2 gas circulation circuits are formed by machining, for example by means of a numerically controlled milling machine or other appropriate machining system to obtain a spiral. This machining is carried out in a spiral converging towards the center of the central block 41 at the level of the through-passage 44.

The machining depth f, shown in FIG. 6, is for example about 10 mm, while the machining width W, also shown in FIG. 6, is about 3 mm. Advantageously, the machining section is equivalent to the section covered by the inner diameter of an Inconel 600 tube of diameter $10/12$. In general, the cross-section of the spiral formed corresponds preferentially to the quantity of gas required to feed the stack 20.

In addition, as shown in FIGS. 5 to 8, it should be noted that the inlet 42 and outlet 43 ducts extend perpendicular to the median plane M in superposition with respect to each other and are separated from each other by a transverse median wall 47 of the central block 41 in which the through-passage 44 is formed.

Furthermore, the central bock 41 has a main portion 61, comprising the first C1 and second C2 gas circulation circuits, and a lateral portion 62 projecting from the main portion 62 at which the inlet 42 and outlet 43 ducts are fluidly connected to the central block 41.

The inlet gases IG, from heat exchangers, enter the first spiral of the first circuit C1 and converge towards the center of the central block 41 to the through-passage 44 over a total length of about 1.8 m. From there, the gases cross the median plane M through the through-passage 44 and follow an opposite path in the second spiral of the second circuit C2 to travel a total length of about 1.8 m as well.

The closure plates 45 and 46 are preferentially attached by laser transmission welding. The laser welding technique allows the welding of metals by the features of laser technology: with the high energy density and fineness of the laser beam, the targeted areas melt and then are quickly welded by cooling. The result is a solid weld on a small surface.

Figure 9:
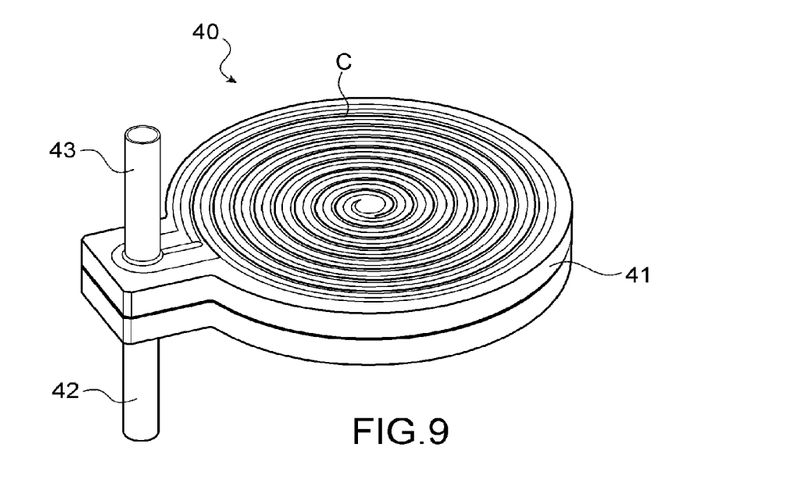
FIG. 9 illustrates the transmission welding path to follow for attaching the closure plates to the main body of the superheat system in FIG. 5.

As shown in FIG. 9, the laser transmission welding should preferentially follow the contour C as shown in order to force the gases to follow the full path.

In addition, it is possible to double the superheat system 40 described above for a plurality of gas lines. Thus, FIGS. 10 and 11 illustrate examples of SOEC/SOFC stacks 20 comprising an assembly 70 of two superheat systems 40 for the inlet gases OG of the stack 20 associated with heating elements 80 in the form of heating plates 80.

Figure 10:
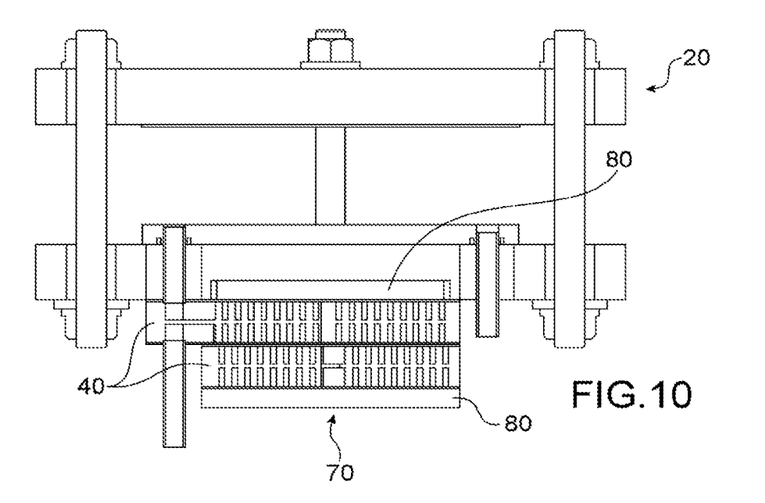
FIG. 10 shows, according to a cross-sectional view, an exemplary SOEC/SOFC stack comprising heating elements on either side of a plurality of superheat systems such as that shown in FIG. 5.

More precisely, in FIG. 10, two heating plates 80 are located on either side of two superheat systems 40 so that they are sandwiched by the heating plates 80. These heating plates 80, in contact with the superheat systems 40, allow the gases to be heated by thermal convection before entering the stack 20.

Figure 11:
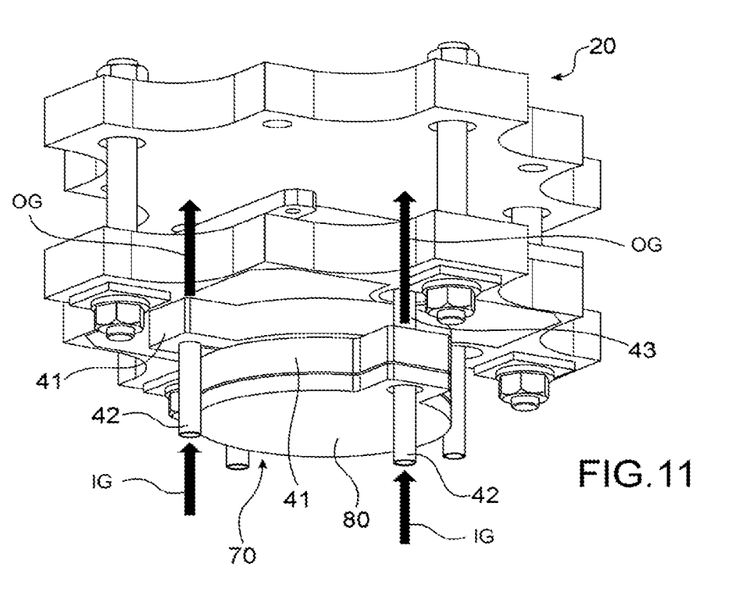
FIG. 11 illustrates, in perspective, another exemplary SOEC/SOFC stack comprising a heating element in contact with a plurality of superheat systems such as that shown in FIG. 5 for two gas lines.

In FIG. 11, the assembly 70 has a heating plate 80 similar in shape to the central block 41.

Of course, the invention is not limited to the exemplary embodiment that has just been described. Various modifications can be made by persons skilled in the art.

The invention claimed is:

1. A solid-oxide electrolyzer cell/solid-oxide fuel cell (SOEC/SOFC) stack, comprising an assembly comprising:
   at least one SOEC/SOFC stack inlet gas superheat system, comprising:
      a main body comprising a first zone for inlet of gases to be heated and a second zone for outlet of heated gases, the first and second zones being separated by a transverse median plane of the main body,
      at least one inlet duct for the gases to be heated communicating with the first zone of the main body,
      at least one outlet duct for the heated gases communicating with the second zone of the main body,
      the first and second zones of the main body comprising respectively a first gas circulation circuit and a second gas circulation circuit,
      the first gas circulation circuit extending in a spiral from a first outer end to a first inner end, and the second gas circulation circuit extending in a spiral from a second outer end to a second inner end,
      the first and second inner ends communicating with each other through a through-passage of the main body, formed through the median plane of the main body for fluid communication of the first and second zones,
      the at least one inlet duct and the at least one outlet duct being in fluid communication with the first and second outer ends, respectively, so that a flow of gas to be heated entering the at least one inlet duct flows into the first gas circulation circuit from the first outer end to the first inner end, and passes through the through-passage and then flows into the second gas circulation circuit, from the second inner end to the second outer end, and then into the at least one outlet duct to reach the inlet of the SOEC/SOFC stack,
      the at least one inlet duct and the at least one outlet duct extend perpendicular to the median plane of the main body in superposition with respect to each other, and
   at least one heating element placed in contact with said at least one gas superheat system.

2. The SOEC/SOFC stack according to claim 1, wherein the at least one gas superheat system comprises a first closure plate and a second closure plate, extending on either side of the main body to cover the first and second zones of the main body, respectively, the first gas circulation circuit being located between the median plane and the first closure plate and the second gas circulation circuit being located between the median plane and the second closure plate.

3. The SOEC/SOFC stack according to claim 1, the at least one inlet duct and the at least one outlet duct are separated from each other by a transverse median wall of the main body in which the through-passage is formed.

4. The SOEC/SOFC stack according to claim 1, wherein the main body has a cylindrical shape.

5. The SOEC SOFC stack according to claim 1, the main body has a main portion, comprising the first and second gas circulation circuits, and a lateral portion projecting from the main portion, the at least one inlet duct and the at least one outlet duct are fluidly connected to the main body at the lateral portion.

6. The SOEC/SOFC stack according to claim 1, wherein the main body is made of nickel-based superalloy.

7. The SOEC/SOFC stack according to claim 1, wherein the assembly comprises at least two heating elements arranged on either side of the at least one gas superheat system.

8. The SOEC/SOFC stack according to claim 1, wherein the assembly comprises at least two gas superheat systems in contact with each other and at least two heating elements sandwiching the at least two gas superheat systems.

9. The SOEC/SOFC stack according to claim 1, wherein the at least one heating element has a shape similar to the shape of the at least one gas superheat system.

10. A process for manufacturing the SOEC/SOFC stack according to claim 1, comprising machining the main body to form the first gas circulation circuit and the second gas circulation circuit.

11. The process according to claim 10, further comprising attaching, by a laser transmission welding process, a first closure plate and a second closure plate on either side of the main body to cover the first and second zones of the main body, respectively.

* * * * *